(12) United States Patent
Rogall et al.

(10) Patent No.: US 8,043,012 B2
(45) Date of Patent: Oct. 25, 2011

(54) SEAL ARRANGEMENT AND A BRUSH SEAL FOR A WIND TURBINE

(75) Inventors: Peter Rogall, Emsbüren (DE); Meng Gao, Shanghai (CN); Yuanyuan Qiu, Shanghai (CN)

(73) Assignee: General Electric Company, Schenectady, NY (US)

( * ) Notice: Subject to any disclaimer, the term of this patent is extended or adjusted under 35 U.S.C. 154(b) by 52 days.

(21) Appl. No.: 12/569,944

(22) Filed: Sep. 30, 2009

(65) Prior Publication Data

US 2010/0135607 A1 Jun. 3, 2010

(51) Int. Cl.
*F16C 33/72* (2006.01)
*F16C 33/78* (2006.01)
*F16J 15/44* (2006.01)

(52) U.S. Cl. .................. 384/477; 384/482; 277/355

(58) Field of Classification Search .......... 384/99, 384/471, 473, 477, 482, 484, 518, 539, 581; 277/36, 95, 355, 384, 411, 916; 416/132 B, 416/132 A, 174, 205; 415/170.1, 173.5, 415/174.3, 231
See application file for complete search history.

(56) References Cited

U.S. PATENT DOCUMENTS

| | | | |
|---|---|---|---|
| 2,009,281 A * | 7/1935 | Stein ........................ 384/482 |
| 3,303,898 A | 2/1967 | Bercaru | |
| 3,489,471 A | 1/1970 | Kelley | |
| 3,749,459 A | 7/1973 | Matuzaki et al. | |
| 3,811,577 A | 5/1974 | Yancey | |
| 3,866,716 A | 2/1975 | Matson | |
| 3,940,191 A | 2/1976 | Tomioka et al. | |
| 4,541,741 A * | 9/1985 | Woodbridge et al. ......... 384/482 |
| 4,668,109 A * | 5/1987 | Basso ........................ 384/484 |
| 4,722,616 A | 2/1988 | Lederman | |
| 4,778,285 A | 10/1988 | Larson | |
| 4,831,921 A * | 5/1989 | Potter ........................ 384/539 |
| 5,174,582 A * | 12/1992 | Ferguson .................... 277/355 |
| 5,265,412 A * | 11/1993 | Bagepalli et al. ............. 277/590 |
| 5,474,305 A | 12/1995 | Flower | |
| 5,749,584 A | 5/1998 | Skinner et al. | |
| 5,749,660 A | 5/1998 | Dusserre-Telmon et al. | |
| 5,944,320 A * | 8/1999 | Werner et al. ................. 277/355 |
| 5,957,000 A | 9/1999 | Pecorari | |
| 6,079,945 A * | 6/2000 | Wolfe et al. ................. 415/174.5 |
| 6,105,967 A * | 8/2000 | Turnquist et al. ............. 277/355 |
| 6,173,958 B1 * | 1/2001 | Dinc et al. .................... 277/303 |
| 6,390,476 B1 | 5/2002 | Tong et al. | |
| 6,428,009 B2 * | 8/2002 | Justak ........................ 277/411 |
| 6,502,824 B2 | 1/2003 | Mayer et al. | |
| 6,558,041 B2 * | 5/2003 | Laos ........................... 384/99 |

(Continued)

FOREIGN PATENT DOCUMENTS

DE 10309383 A1 * 9/2003

(Continued)

*Primary Examiner* — Marcus Charles
(74) *Attorney, Agent, or Firm* — Global Patent Operation; Douglas D. Zhang

(57) ABSTRACT

A seal arrangement for sealing a bearing comprising a first component and a second component which are rotatably movable with respect to each other is provided. The seal arrangement includes brush seal having an annular brush body carried by the first component and a bundle of resiliently bendable bristles. The brush seal is adapted to maintain a sealing condition when the first and second component are moved relative to each other in a non-rotational manner. Further, a brush seal and a wind turbine having a brush seal are provided.

20 Claims, 7 Drawing Sheets

U.S. PATENT DOCUMENTS

| | | | |
|---|---|---|---|
| 6,739,592 B2 * | 5/2004 | Kono | 277/355 |
| 6,774,504 B1 | 8/2004 | Lagerwey | |
| 6,779,799 B2 | 8/2004 | Tong et al. | |
| 6,783,326 B2 | 8/2004 | Weitkamp et al. | |
| 6,808,180 B2 * | 10/2004 | Shore | 277/355 |
| 6,840,518 B2 * | 1/2005 | Boston | 277/411 |
| 6,991,378 B2 * | 1/2006 | Jacquemont et al. | 384/471 |
| 7,077,630 B2 | 7/2006 | Wobben | |
| 7,165,771 B2 * | 1/2007 | Beichl et al. | 277/421 |
| 7,182,345 B2 * | 2/2007 | Justak | 415/231 |
| 7,270,333 B2 | 9/2007 | Addis | |
| 7,410,173 B2 * | 8/2008 | Justak | 277/355 |
| 2002/0020968 A1 * | 2/2002 | Gail et al. | 277/355 |
| 2003/0006559 A1 * | 1/2003 | Inoue | 277/355 |
| 2003/0062684 A1 * | 4/2003 | Inoue | 277/355 |
| 2005/0146095 A1 * | 7/2005 | Gebert | 277/355 |
| 2008/0104821 A1 * | 5/2008 | Erill et al. | 29/450 |
| 2008/0246224 A1 | 10/2008 | Pabst et al. | |
| 2008/0258403 A1 * | 10/2008 | Beichl et al. | 277/355 |

FOREIGN PATENT DOCUMENTS

| | | |
|---|---|---|
| DE | 102006053832 A1 * | 5/2008 |
| EP | 0981702 B1 | 6/2003 |
| EP | 2096303 A1 * | 9/2009 |
| JP | 2000-257642 A2 | 9/2000 |
| JP | 2004-245158 A2 | 9/2004 |
| JP | 2007-192383 A2 | 8/2007 |
| SU | 1462917 A1 * | 11/1996 |

* cited by examiner

US 8,043,012 B2

SEAL ARRANGEMENT AND A BRUSH SEAL FOR A WIND TURBINE

BACKGROUND OF THE DISCLOSURE

The present disclosure generally relates to the sealing of bearings, and, more particularly, to the sealing of wind turbine bearings.

Wind turbines are of increasing importance as an environmentally safe and relatively inexpensive energy source. For protection of the environment, it is also desirable to avoid grease leakage from the bearings. A grease leakage may occur if the bearings (e.g. the pitch bearings of a wind turbine) are exposed to high dynamic loads causing a bearing deformation. In view of this, a wind turbine having a sealed bearing is disclosed herein. Further, a brush seal with a plurality of flexible bristles for sealing a bearing, and a seal arrangement including a brush seal having a bundle of resiliently bendable bristles are disclosed herein.

BRIEF DESCRIPTION OF THE DISCLOSURE

A seal arrangement for sealing a bearing is provided. The bearing includes a rotational axis, a first component and a second component. At least one of the first component and the second component are rotatably movable around the rotational axis. According to a first embodiment, the seal arrangement includes a brush seal having an annular brush body which is carried by the first component. The brush seal further includes a bundle of resiliently bendable bristles and is adapted to maintain a sealing condition when the first and second component are moved relative to each other in a non-rotational manner.

Further, a brush seal for a bearing between a first and a second part of a wind turbine is provided. The bearing includes a rotational axis, an inner annular member fastened to the first part, an outer annular member fastened to the second part and a circumferential gap therebetween. According to another embodiment, the brush seal includes a plurality of flexible bristles which closes the circumferential gap such that the plurality of flexible bristles are pre-stressed in a plane which includes the rotational axis.

Furthermore, a wind turbine having a first part and a second part is provided. The second part is pivot-mounted with respect to the first part using a rolling-element bearing. The rolling-element bearing includes a lubricant and a rotational axis. According to yet another embodiment, the wind turbine further includes a brush seal having a bundle of resiliently bendable bristles. The brush seal is adapted to prevent a leakage of the lubricant and/or to prevent a penetration of dust when the first part and the second part are moved relative to each other in a non-rotational manner.

Further aspects, advantages and features are apparent from the dependent claims, the description and the accompanying drawings.

BRIEF DESCRIPTION OF THE DRAWINGS

A full and enabling disclosure of embodiments, including the best mode thereof, to one of ordinary skill in the art, is set forth more particularly in the remainder of the specification, including reference to the accompanying figures wherein.

For clarity reasons, the same elements or method steps have been designated by the same reference signs in the different drawings and diagrams if not stated otherwise.

DETAILED DESCRIPTION OF THE DISCLOSURE

Reference will now be made in detail to the various embodiments of the disclosure, one or more examples of which are illustrated in the figures. Each example is provided by way of explanation of the disclosure, and is not meant as a limitation. For example, features illustrated or described as part of one embodiment can be used on or in conjunction with other embodiments to yield yet a further embodiment. It is intended that such modifications and variations are included herewith.

Figure 1:
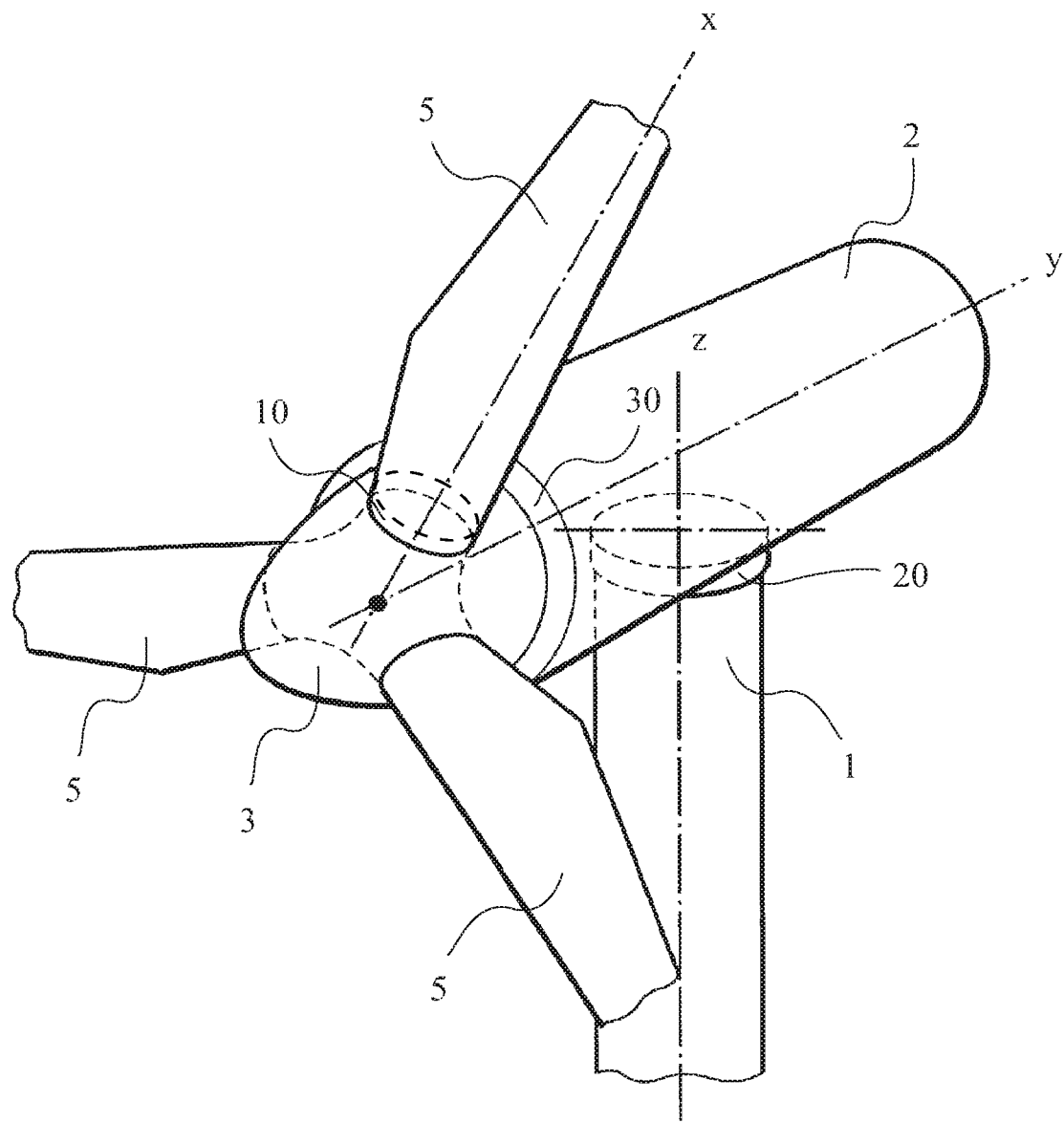
FIG. 1 shows a schematic side view of a wind turbine in which several embodiments are applicable.

FIG. 1 shows a schematic side view of a typical horizontal-axis wind turbine 500. The wind turbine 500 includes a tower 1 to which a machine nacelle 2 is mounted at its top end. A rotor having a hub 3 which bears one or more rotor blades 5 is mounted rotatably around an essentially horizontal y-axis to a lateral end of the machine nacelle 2. The rotor blades 5 are typically mounted to pitch bearings 10 and can be adjusted around respective x-axes by pitch drives (not shown) accommodated inside the hub 3. Further, the nacelle 2 can typically be aligned in wind direction using a yaw drive 20 which turns the nacelle 2 around the vertical z-axis. In the context of this application, the term "wind turbine" or "wind power installation" refers to a machine that converts the kinetic energy of the wind into mechanical energy. The mechanical energy is typically further converted into electrical energy using an asynchronous main generator or a synchronous main generator. The main generator typically delivers electrical power which can be fed into a utility grid up to a rated generator output power. The length of the rotor blades 5 increases in line with the rated generator output power. For wind turbines with a rated generator output power in the MW range, rotor blades with lengths of up to 60 meters or even more are used. The mechanical load on the pitch bearing 10 typically increases in accordance with the length and weight of the rotor blades 5 as well as the wind speed. At least at higher wind speed, the dynamic load may cause a dynamic deformation of the pitch bearing 10 which may amount up to several millimeters for larger rotor blades 5. This may pose a challenge for potential leaking at the pitch bearings 10. Note that this applies to other bearings under load too, in particular to the yaw bearing 20 between the tower 1 and the nacelle 2 which is typically also exposed to heavy dynamic load during the operation of the wind turbine 100. Due to strict antipollution rules, even a slight leakage of grease from the pitch bearing 10 and/or the yaw bearing 20 is unacceptable in many countries. Therefore, long term stable sealing against grease leakage with low friction is often desirable for the bearings of a wind turbine 500. It is, however, difficult to prevent the grease leakage from these bearings with conventional rubber seals at least in the long term. This is because rubber abrasion is unavoidable and dynamic bearing deformation may be comparatively large. Using a tighter rubber structure to maintain good sealing over a longer period is often not feasible since the friction from the seal contact will increase accordingly. Besides losses, increased friction may raise severe control problems. For example, a blade angle asymmetry fault may occur at higher seal friction of the pitch bearing 10. Similar problems may arise for bearings which are sealed using a conventional rubber labyrinth. In this event, friction and abrasion may also become comparatively high during bearing deformation, at least when rubber parts of the labyrinth seal come in direct contact with each other.

Figure 2:
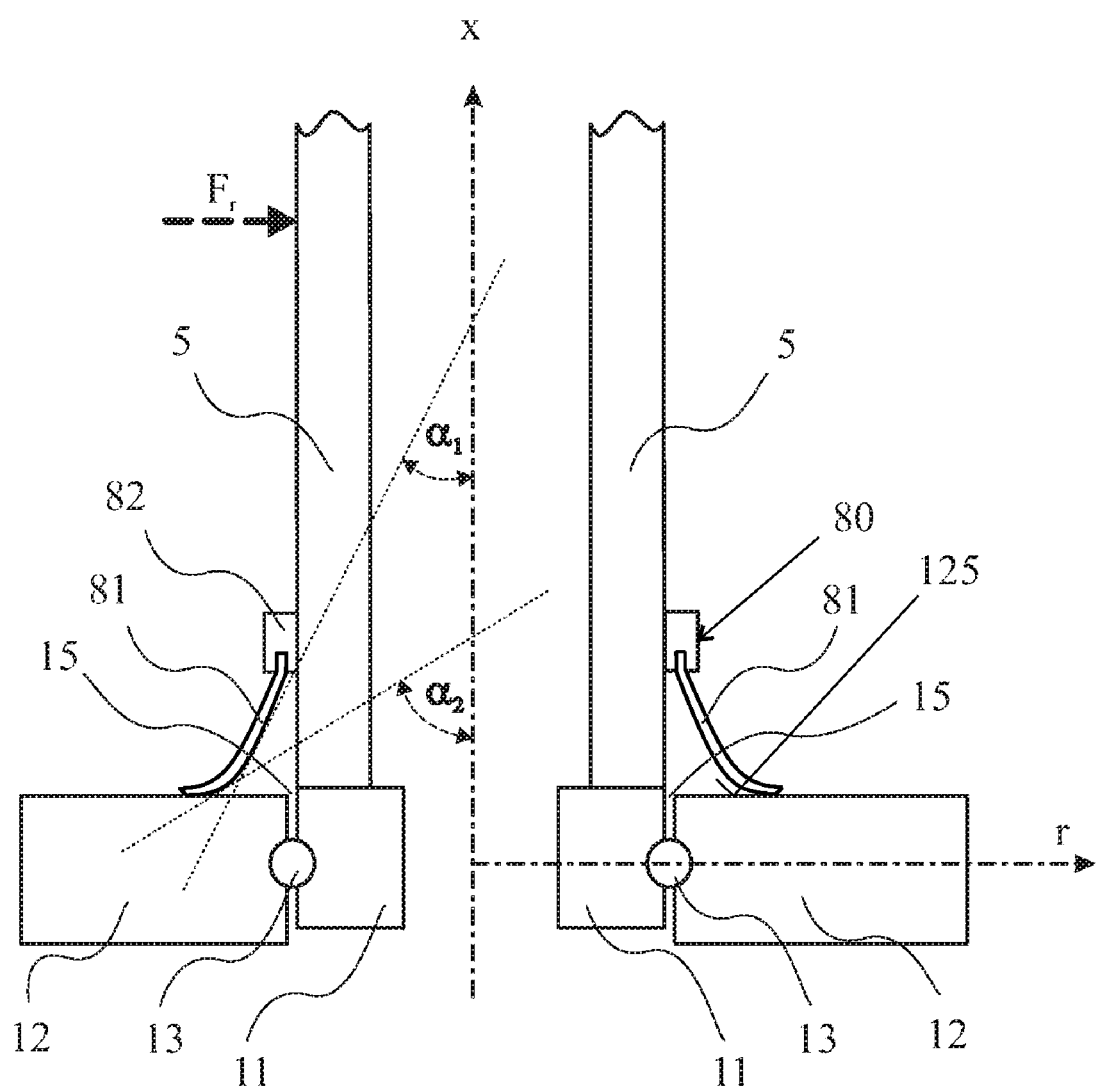
FIG. 2 shows a cross-sectional view of a rotor blade mounted to a pitch bearing of a wind turbine and a brush seal according to an embodiment.

FIG. 2 shows, in a cross-section along a rotational x-axis, a seal arrangement 100 for a pitch bearing between a rotor blade 5 and a hub 3 of a rotor of a wind turbine 500 as shown in FIG. 1. The pitch bearing consists of an inner annular member 11 mounted to the rotor blade 5 and an adjacent outer annular member 12 which is mounted to the hub (not shown) and coaxially arranged around the inner member 11 and the rotational axis x. In doing so, the rotor blade 5 is pivot-mounted around the x-axis relative to the nacelle. Typically, a lubricated rolling-element bearing with a toroidal groove 13 formed between an inner and an outer race for accommodating rolling elements (such as spheres, balls or cylinders) is used as pitch bearing. Further, a circumferential gap 15 is formed between the inner annular member 11 and outer annular member 12. The circumferential gap 15 also forms an annular opening between the rotor blade 5 and the hub 3, from which the lubricant of the pitch bearing may leak. According to a first embodiment, an annular brush seal is arranged between the hub 3 and the rotor blade 5 of the wind turbine for preventing the leakage of the lubricant such as grease. The term "brush," as used in this specification, intends to describe a device with a plurality of bristles, wire or other resiliently bendable filaments. The brush seal includes a bundle of resiliently flexible bristles or resiliently bendable bristles 81, i.e. a plurality of such bristles, which prevents leakage through the circumferential gap 15. The bundle of resiliently flexible bristles 81 is arranged such that the bristles are pre-stressed in a plane which includes the rotational x-axis. In other words, the bundle 81 of resiliently flexible bristles is assembled with the pitch bearing and the rotor blade 5 such that the bristles are bent or deformed in radial direction r.

In FIG. 2, the bristles are secured to an annular brush body 82 which is fastened to the rotor blade 5, and deflected due to a mechanical contact with a contact or sealing surface 125 of the outer annular member 12. In other words, the bristles are deformed out of their natural, or relaxed, state during assembly of the brush seal due to contacting the free end or tip portion of the bristle bundle 81 with the sealing surface 125, and typically assume curved profiles at least in respective parts bridging or closing the circumferential gap 15 as illustrated by the two different angles $\alpha_1$ and $\alpha_2$ between respective tangents (dotted lines) to the bundle of resiliently flexible bristles 81 and the rotational axis x. Typically, the tip portion of the bundle of resiliently flexible bristles 81 contacts the sealing surface 125 at an angle which deviates substantially from 90°. In other words, the flexible bristles closing the circumferential gap 15 are pre-stressed or pre-bent, which ensures a close contact between the bristles and the contact or sealing surface 125. During operation, i.e. rotation of the rotor blade 5 around the x-axis, the tip portion of the bundle of resiliently flexible bristles 81 wipes against the contact surface 125 and maintains the sealing against grease leakage form the pitch bearing. Any grease leakage from the pitch drive can thus be absorbed by the bristles of the brush sealing. Note that the annular line speed of the rotating pitch bearing is typically comparatively low, e.g. below 0.3 m/s. The slow rotation facilitates stopping the grease flow due to the high stickiness of grease, even when bristles are not very well arranged.

Further, the pre-bending of the bristles is typically set during assembly such that a changing geometry of the circumferential gap 15 due to excursions resulting from dynamic load can still be covered. A fluctuating wind speed and/or a height depended wind profile will typically cause a fluctuating force $F_r$ acting on the rotor blade 5 in radial direction r, which is perpendicular to the rotational axis x, This, in turn, may cause radial excursion and/or tilting of the inner annular member 11 and outer annular member 12 relative to each other which is accompanied by a changing geometry of the circumferential gap 15. Further, there is typically a load component acting on the inner member 11 in direction of the x-axis. This load component depends on rotational speed of the rotor as well as on orientation of the rotor blade 5 with respect to gravitational force (z-axis), and may yield axial excursion, i.e. a displacement of the inner annular member 11 relative to the outer annular member 12 in direction of the x-axis and hence a changing geometry of the circumferential gap 15 too. Typically, the resiliently flexible bristles are pre-bent such that the circumferential gap 15 remains sealed against grease leakage by the brush seal when the geometry of the circumferential gap 15 is changed.

A change of the geometry of the circumferential gap 15 may also occur when the inner annular member 11 is tilt relative to the outer annular member 12. This will be explained in more detail below. In other words, the resiliently flexible bristles are typically pre-bent such that the circumferential gap 15 remains sealed when the inner annular member 11 and the outer annular member 12 are moved relative to each other in a non-rotational manner. The phrase that inner annular member 11 or a first component and the second annular member 12 or a second component which are rotatably movable around a common rotational axis "are moved relative to each other in a non-rotational manner" as used in this specification, intends to describe a relative movement of the two members or components to each other which is not a rotational movement around the common rotational axis. Typically, a movement in a non-rotational manner includes a relative translational movement of the two members or components in direction which is parallel to the common rotational axis and/or a tilting around a further axis which is orthogonal to the common rotational axis. For sake of clarity, the common rotational axis is also referred to as rotational axis.

Furthermore, the brush can typically stop entering of sand and dust, and/or at least reduce the amount of water and/or moisture entering into the inside of the pitch bearing 10. In doing so, the life of the pitch bearing can be increased. Note that particles such as sand or dust sticking to the bristles will have little effect on the seal performance, especially the ability to absorb grease, at least as long as the concentration of sticking particles does not become too high. In other words, the brush seal can also protect the pitch bearing inside against external particles invasion. This is not feasible for brush seals as used in continuous high-speed rotation machine (line speed roughly >40 m/s, ~3000 rpm), such as gas turbines, due to the required high accuracy of arrangement of bristles having bristles tips that do not contact a sealing surface. Note that a hermetical, i.e. an air-tight, seal is typically not required for a pitch bearing.

Typically, the bristles are made of non-metallic materials such as plastic fibers and/or organic fibers including fibrous structural proteins such as keratins and/or Kevlar™. Non-metallic brush seals afford low bristle stiffness thereby facilitating a zero clearance between the sealing surface 125 and the brush bristles. Furthermore, the low stiffness and non-metallic bristles accommodate axial excursions and radial excursions without damage to the rotor blade 5, the pitch bearing 10 and the seal arrangement 100.

A similar brush sealing can also be mounted between the nacelle 2 and the tower 1 of the wind turbine 500. The yaw bearing 20 between the nacelle 2 and the tower 1 of the wind turbine 500 is also typically subjected to dynamic load, e.g. due to variable wind conditions, and typically rotates relatively slowly. Therefore, a seal arrangement 100 with bristles which are pre-bent in radial direction can be used both to protect the yaw bearing against penetration of dust, sand, moisture and/or water and to protect the environment against possible grease leakage from the yaw bearing.

Furthermore, a brush-sealing with radially pre-bent bristles may also be used to protect the annular gap 30 between the hub 3 and the nacelle 2 of the wind turbine 500 shown in FIG. 1 against penetration of dust and sand and/or to reduce the penetration of moisture and/or water. This may be particularly useful for protecting the components typically arranged inside the nacelle 2 such as the main generator, if the wind turbine 500 is installed in a region of harsh climate, e.g. off-shore or in a dessert.

Figure 3:
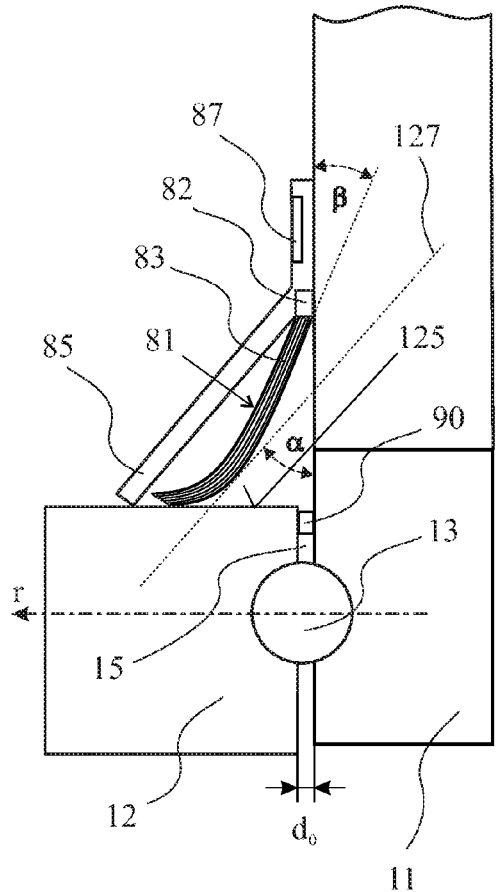
FIGS. 3 and 4 illustrate, in a cross-section, the operation of a brush seal between a rotor blade and a pitch bearing of a wind turbine according to certain embodiments.
Figure 4:
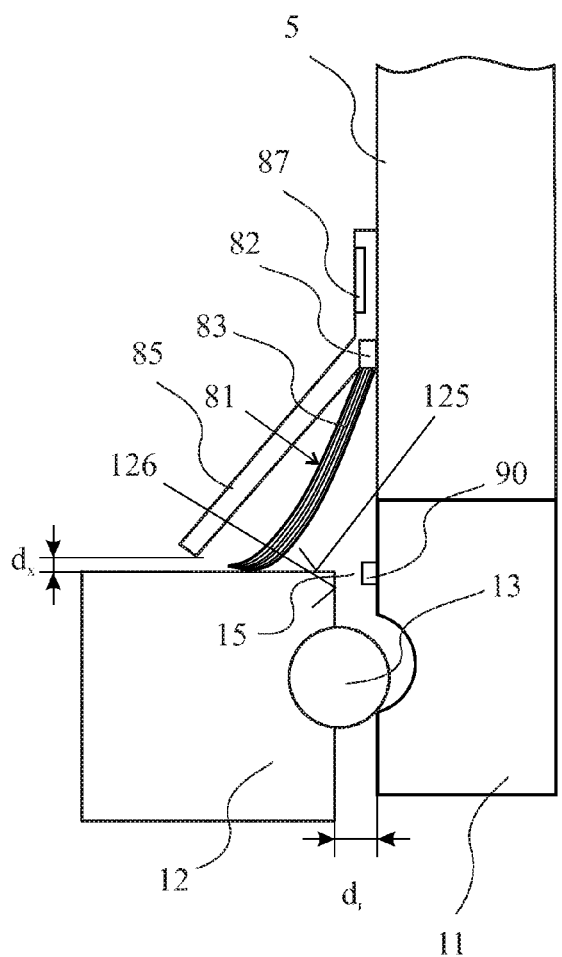

FIGS. 3 and 4 illustrate, in a cross-section, the operation of a brush seal between a rotor blade 5 and a pitch bearing according to certain embodiments. FIG. 3 shows only the right half of the cross-section of a seal arrangement 100 which is similar to the seal arrangement 100 of FIG. 2 when the inner annular member 11 and outer annular member 12 are coaxial to each other, i.e. when there is no dynamic load or not enough loads to deform the bearing. In addition, individual bristles 83 of the bundle of resiliently bendable bristles or bristle pack 81 are shown. The bristles 83 are pre-stressed in radial direction r due to a contact between a tip portion of the bristle pack 81 and a sealing surface 125 of the outer annular member 12 of the pitch bearing. Accordingly, the bristles are curved in the annular gap between the rotor blade 5 and the outer annular member 12 as indicated by the angle α between the rotational axis, which is perpendicular to the radial direction r, and the tangent 127 to one of the bristle 83 in a point. The curve progression of the bristles 81 depends on the elastic properties of the bristles 81 and the pre-bending force acting on the bristles 81. Typically, the bristles elongate essentially straight without any pre-bending forces acting on them. According to an embodiment, the annular brush is manufactured and arranged such that the bristles leave the annular brush body 82 in a direction which deviates from the direction of the rotational axis by an angle β. The brush body 82 may include two annular metallic plates. Therebetween, thousands of densely packed bristles 81 are typically fused. The bristles 81 may leave the annular brush body 82 in a direction which deviates from the direction of the rotational axis by e.g. a few degrees even when no pre-stress is applied. In doing so, the mounting of the brush seal is simplified as the bristles 81 are less likely to enter the thin annular or circumferential gap 15 between face to face arranged surfaces of the outer annular member 12 and the inner annular member 11.

According to another embodiment, the circumferential gap 15 of the pitch bearing contains already a primary seal formed by an annular rubber gasket 90. The annular rubber gasket 90 is typically arranged between and fastened to one of the outer annular member 12 and the inner annular member 11, such that the bearing is sealed when the outer annular member 12 and the inner annular member 11 are coaxial to each other as shown in FIG. 3. To provide a primary sealing, the extension of the unloaded annular rubber gasket 90 in radial direction r is typically close to the extension $d_0$ of the circumferential gap 15 in radial direction r. In this event, the brush seal provides an independent second shield for protecting the pitch bearing and enhancing the bearing life, as well as to avoid environment contamination by keeping any leakage inside.

According to yet another embodiment, an annular rubber shield 85 which covers the plurality of flexible bristles 81 is also provided. The rubber shield 85 typically protects the flexible bristles 81 and the bearing inside against environment influences. The rubber shield 85 and the brush body 82 are typically bonded together using an adhesive. Further, a fastener such as a belt or adhesive foil keeps the rubber shield 85 at proper position.

Due to the radial pre-bending of the bristles 81 against the sealing surface, the sealing of the bearing is maintained even when the pitch bearing is deformed. This is explained with reference to FIG. 4 showing the seal arrangement 100 of FIG. 3 but with deformed pitch bearing due to external load. As explained with reference to FIG. 2, dynamic load may cause excursion, i.e. displacements in a radial direction and/or in parallel to the rotational axis, and/or tilting of the inner annular member 11 and outer annular member 12 relative to each other. This is accompanied by a change of the circumferential gap 15. The sketch of FIG. 4 can correspond to a situation of a tilted pitch bearing or an axial and radial excursion pitch bearing. In the shown Section, the rubber gasket 90 is lifted by a distance $d_x$ in axial direction, i.e. direction of the rotational axis; and radial direction, the circumferential gap 15 is increased to a distance $d_r$ which is larger than $d_0$. In the event of a tilted bearing, the distance $d_r$ between the inner annular member 11 and outer annular member 12 will depend on the axial co-ordinate (x). But this is not shown in the schematic drawing of FIG. 4 in which the displacements are exaggerated instead. For a typical pitch bearing, the normal width $d_0$ is in a range of about 10 mm to 20 mm, and the change $|dr-d_0|$ as well as $|d_x|$ typically range up to 1 mm or 2 mm. Such a displacement may result in a local loss of primary sealing as the rubber gasket 90 may lose contact with its sealing surface 126. Note that the primary sealing is typically maintained in other sections than the one shown. However, even a temporary local leakage of the pitch bearing may cause grease leakage to the environment and/or contamination of the inner bearing from outside. This is prevented by the brush sealing. The bending states of the bristles 81 are changed, i.e. the bending of the bristles 83 becomes weaker in FIG. 4 compared to the bending states of the respective bristles 83 of FIG. 3, but the contact between the sealing surface 125 for the brush seal and the tip portion of the bristles pack 81 is maintained. In doing so, a good sealing condition of the pitch bearing is maintained. The hairy brush will typically retain any possible grease leakage from the inner bearing and prevent or at least diminish contamination of the inner bearing, from the outside.

Figure 5:
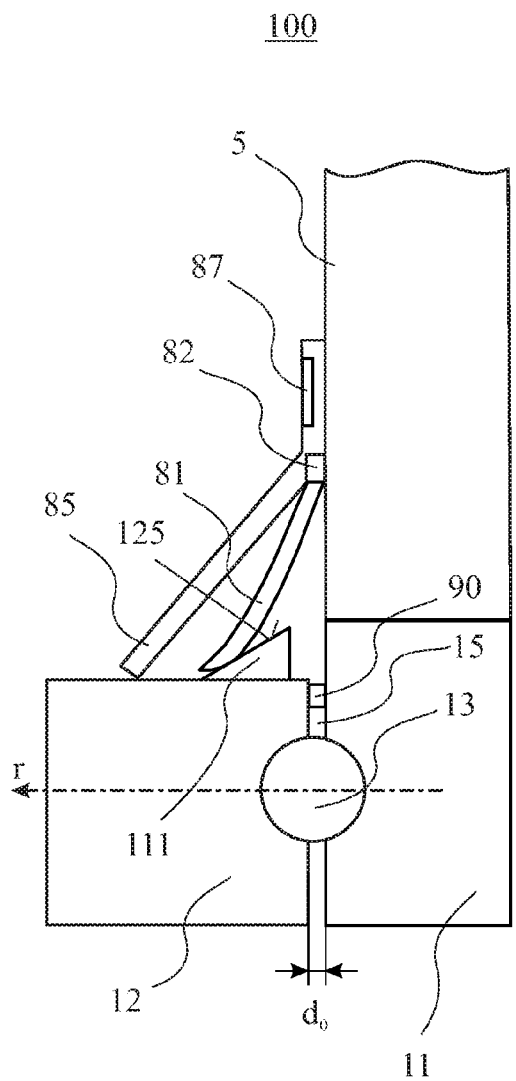
FIGS. 5 and 6 illustrate in a cross-section the operation of a brush seal between a rotor blade and a pitch bearing of a wind turbine according to another embodiment.
Figure 6:
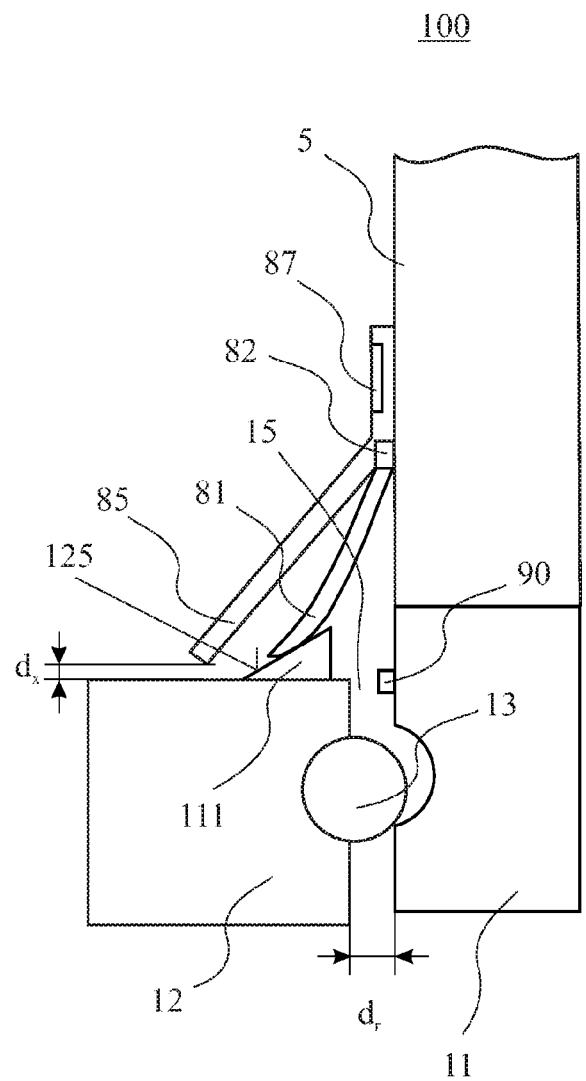

With respect to FIGS. 5 and 6, still another embodiment will be explained. The seal arrangement 100 drawn in a cross-section in FIGS. 5 and 6 without and with deformed pitch bearing, respectively, is similar to the one illustrated in FIGS. 3 and 4. In addition it includes an annular ramp 111 on the outer annular member 12 of the pitch bearing. The annular ramp 111 provides the sealing surface 125 to which at least a part of the plurality of flexible bristles is tangent at least in a tip region. In other words, the flexible bristles are pre-stressed or pre-bent against the annular ramp 111. As the sealing surface 125 is inclined to the radial direction r, the bending of the bristles may increase when the radial width between the outer annular member 12 and the inner annular member 11 is increased from $d_0$ in FIG. 5 to $d_r$ in FIG. 6. In other words, at least a part of the resiliently bendable bristles remain bent when the bearing is deformed due to varying external loads. Again, the brush sealing with bristles which are pre-bent against the sealing surface 125 maintains a good sealing condition when the bearing is deformed. As explained above, such a brush seal can also be used for other parts of the wind turbine 500 which are rotatably mounted to each other. This will be explained in more detail with reference to FIG. 7.

Figure 7:
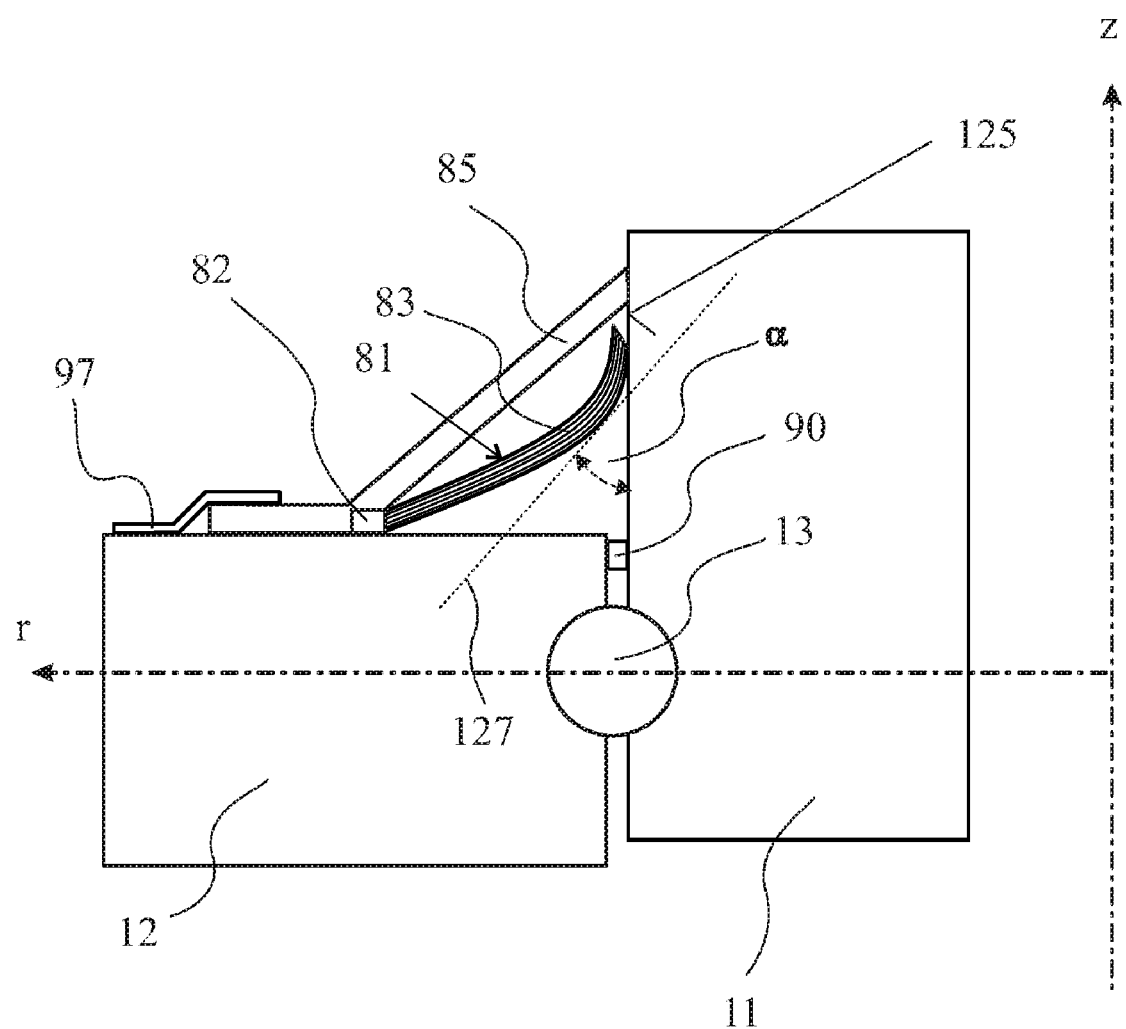
FIG. 7 shows a cross-sectional view of a yaw bearing between a tower and a nacelle of a wind turbine and a brush seal according to an embodiment.

FIG. 7 shows a cross-sectional view of a brush seal arrangement 100 of a yaw bearing 20 of a wind turbine 500, such as illustrated in FIG. 1 between a tower 1 and a nacelle 2 according to an embodiment. The seal arrangement 100 of FIG. 7 is similar to the seal arrangement of FIG. 3. It also maintains a good sealing condition when the yaw bearing is deformed due to a dynamic external load. This is again achieved by pre-stressing the bendable bristles against a sealing surface 125. However, in FIG. 7 the annular brush body 82 as well as the annular rubber shield 85 are fastened to the outer annular member 12 of the yaw bearing using e.g. a clamp 97. Further, the inner annular member 11 and the outer annular member 12 of the yaw bearing are mounted to the nacelle and the tower of the wind turbine, respectively. Furthermore, the sealing surface 125 which is touched by the tip portion of the bristle pack 81 belongs to the inner annular member 11.

It goes without saying, that a brush seal with bristles which are pre-bent in radial direction may be arranged in different ways between a first and a second part of a wind turbine which are mounted rotatably to each other using a bearing. The brush body may be fastened to the inner annular member of the bearing or to the first part which is mounted to the inner annular member. In this event, the tip portion of the bended bristle pack is in mechanical contact with the outer annular member and/or the second part which is mounted to the outer annular member. In other embodiments, the brush body is fastened to the outer annular member of the bearing or to the second part which is mounted to the outer annular member. The tip portion of the bended bristle pack is in mechanical contact with the inner annular member and/or the first part which is mounted to the outer annular member.

Further, a brush seal which includes an annular brush body and a bundle of resiliently bendable bristles, and which is adapted to maintain a good sealing when the bearing is deformed by radially pre-bending the bristles may also be applied to other bearings which typically rotate with an annular line speed that is lower than about 5 m/s, e.g. between a machine housing and a rotor or around a rotary shaft.

Figure 8:
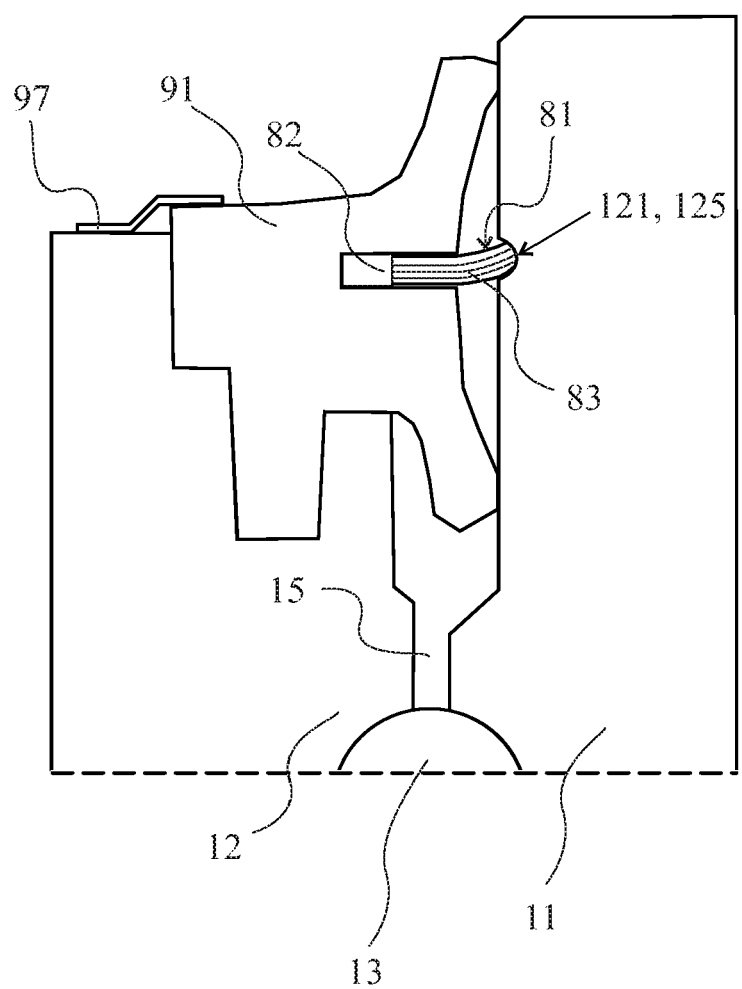
FIG. 8 shows a cross-sectional view of a brush seal of a bearing according to yet another embodiment.

Turning now to FIG. 8, there is explained yet another embodiment for a sealing arrangement 101 of a bearing. FIG. 8 shows again a cross-sectional view through a part of a non-deformed bearing which is sealed with a brush having a pack 81 of resiliently bendable bristles 83. Typically, the bearing is a rolling-element bearing such as a roller bearing, a ball bearing or a needle bearing. According to an embodiment, the brush body 82 is fastened via an annular rubber gasket 91 to the outer annular member 12 and the resiliently bendable bristles 83 are pre-stressed against a sealing surface 125 of the inner annular member 11 of the bearing. The annular rubber gasket 91 is adapted to provide a primary seal for the bearing. Accordingly, it touches the inner annular member 11 too, typically in one or two regions. In an alternative, the brush body 82 is fastened via the annular rubber gasket 91 to the inner annular member 11 and the bristles 81 are pre-stressed against a sealing surface 125 of the outer annular member 12. Typically, the brush body 82 is glued or glue-bonded to the annular rubber gasket 91. The annular rubber gasket 91 is also typically glued to the member of the bearing which carries the rubber gasket 91. Alternatively and/or in addition, the annular rubber gasket 91 is fixed with an annular fastener such as the shown clamp 97. As the brush is typically built into the rubber gasket 91, the combined seal can be handled as one seal during assembly. After assembly the plurality of pre-bend bristles 81 typically prevent grease leakage and contamination of the inner bearing during bearing deformation. This is because at least a tip portion of the bristle pack 81 remains in direct contact with the sealing surface 125 during bearing deformation.

In yet another embodiment, the sealing surface 125 is formed by an annular notch 121 to which a tip portion of the bundle of resiliently bendable bristles engages.

Figure 9:
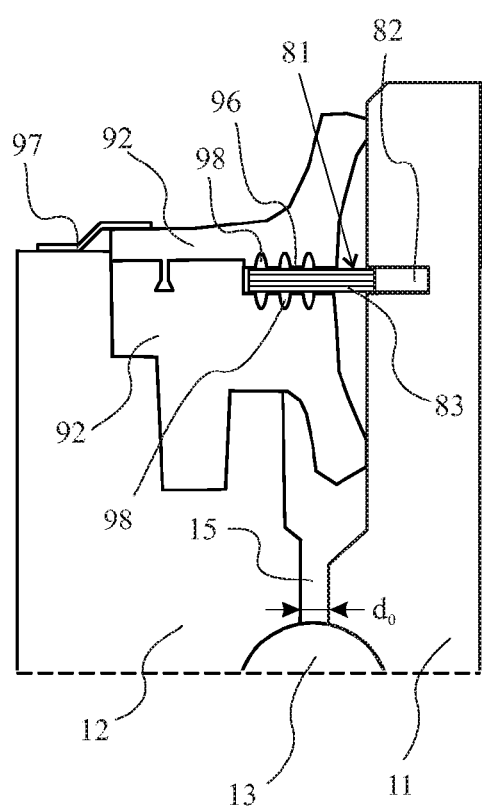
FIGS. 9 and 10 illustrate, in a cross-section, the operation of a brush seal of a bearing according to still another embodiment.
Figure 10:
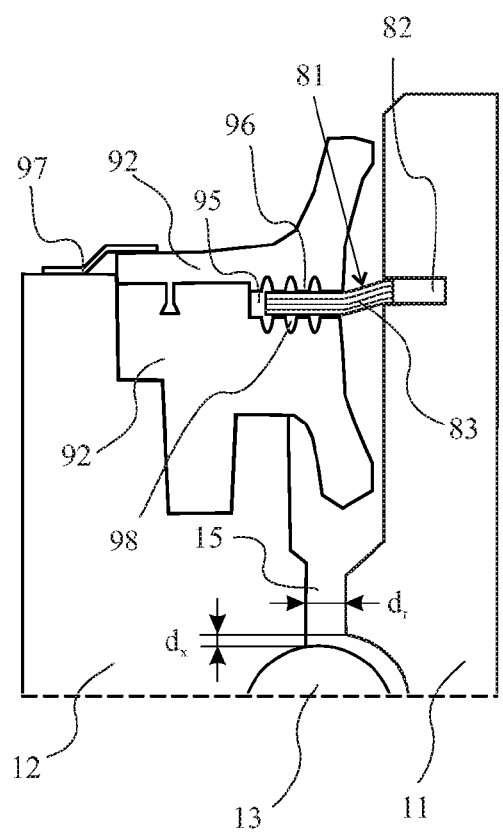

FIGS. 9 and 10 illustrate, in a cross-section, the operation of a brush seal of a bearing according to still another embodiment. Accordingly, a tip portion of the bundle 81 of resiliently bendable bristles 83 is accommodated in an annular void 95 of a rubber gasket 92 which is fastened to the outer member 12 of a bearing. The annular rubber gasket 92 is again adapted to provide a primary seal for the bearing. Accordingly, it is in mechanical contact with the inner annular member 11 too. The brush body 82 is fastened in an annular void of the inner annular member 11 of the bearing. As can be appreciated from FIGS. 9 and 10 showing the seal arrangement 102 without and with a bearing deformation, respectively, a good sealing of the bearing during bearing deformation can be maintained in this arrangement even if the bristles are not pre-bent, i.e. essentially straight, when the bearing is not deformed. In the event of a bearing deformation (FIG. 10), the bristles 83 may be pulled out slightly and are typically bent, but at least the bristles tips remain in the annular void 95. Consequently, a good seal is maintained. To reduce friction, the annular void 95 may be formed similar like a labyrinth seal such that the bristles are only in contact with the rubber gasket 92 at annular labyrinth tooth 96. Since the brush bristles 83 have very high flexibility much lower contact force will occur between bristles and rubber compared to known labyrinth seals. Further, the annular void 95 and the annular labyrinth grooves 98, respectively, may be pre-filled or partially per-filled with a grease to further reduce the friction between the resiliently bendable bristles 83 and the rubber gasket 92.

Unlike known labyrinth seal, the brush seal is designed to come in contact with the sealing surface 125 to provide a positive seal. Further, brush seals are compact and need appreciably less space than labyrinth seals. It is the flexibility of the hair-like bristles which enables the seal to automatically adjust to accommodate bearing deformations. To achieve this, the bristles are typically arranged such that their bending states in the radial direction r changes when the bearing is deformed.

This written description uses examples to disclose embodiments, including the best mode, and also to enable any person skilled in the art to make and use such embodiments. While various specific embodiments have been described, those skilled in the art will recognize other embodiments can be practiced with modification within the spirit and scope of the claims. The brush seal may e.g. also be formed in a semi-annular or plate-like (e.g. rectangular) shape if appropriate for a location to be sealed. Especially, mutually non-exclusive features of the embodiments described above may be combined with each other. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A seal arrangement for sealing a bearing, the bearing comprising a rotational axis, a first component and a second component, the second component comprising a sealing surface, at least one of the first component and the second component being rotatably movable around the rotational axis, the seal arrangement comprising:
a brush seal comprising:
an annular brush body carried by the first component; and
a bundle of resiliently bendable bristles attached to the annular brush body and pre-stressed against the sealing surface with a tip portion of the bundle of resiliently bendable bristles being bent away from the first component.

2. The seal arrangement according to claim 1, wherein the brush seal is configured to maintain a sealing condition when the first component and the second component are tilted with respect to each other.

3. The seal arrangement according to claim 1, wherein the brush seal is configured to maintain a sealing condition when the first component and the second component are displaced relative to each other in a direction parallel to the rotational axis.

4. The seal arrangement according to claim 1, wherein the resiliently bendable bristles are bent when the first component and the second component are coaxially arranged to each other.

5. The seal arrangement according to claim 1, wherein the resiliently bendable bristles are pre-bent in a plane which comprises the rotational axis.

6. The seal arrangement according to claim 1, wherein the resiliently bendable bristles are bent when the first component and the second component are tilted or displaced in a direction parallel to the rotational axis.

7. The seal arrangement according to claim 1, wherein the first component is an inner annular member of a rolling-element bearing, wherein the second component is an outer annular member of the rolling-element bearing, and wherein the rolling-element bearing is selected from a group consisting of a roller bearing, a ball bearing and a needle bearing.

8. The seal arrangement according to claim 1, wherein the first component is an outer annular member of a rolling-element bearing, wherein the second component is an inner annular member of the rolling-element bearing, and wherein the rolling-element bearing is selected from a group consisting of a roller bearing, a ball bearing and a needle bearing.

9. The seal arrangement according to claim 1, wherein the bearing further comprises a circumferential gap between the first component and the second component, and an annular rubber gasket configured to primarily seal the circumferential gap when the first component and second component are coaxial.

10. The seal arrangement according to claim 9, wherein the second component comprises an annual notch, and wherein the tip portion of the bundle of resiliently bendable bristles engages the annual notch, and wherein the resiliently bendable bristles are bent at least when the first component and the second component are coaxially arranged to each other.

11. The seal arrangement according to claim 1, wherein the bearing further comprises a circumferential gap between the first component and the second component, and an annular rubber gasket configured to primarily seal the circumferential gap when the first component and second component are coaxial, wherein the annual rubber gasket comprises an annular void, and wherein the tip portion of the bundle of resiliently bendable bristles is accommodated in the annular void.

12. A brush seal for a bearing between a first part and a second part of a wind turbine, the bearing comprising a rotational axis, an inner annular member fastened to the first part, an outer annular member fastened to the second part and a circumferential gap between the inner annular member and the outer annular member, the brush seal comprising:
an annular brush body fastened to one of the first part and the inner annular member; and
a plurality of flexible bristles attached to the annular brush body and pre-stressed against a sealing surface of one of the second part and the outer annular member with a tip portion of the plurality of resiliently bendable bristles being bent away from the one of the first part and the inner annular member.

13. The brush seal according to claim 12, wherein the annular brush body is fastened to the first part, and wherein the plurality of flexible bristles is pre-stressed against the sealing surface of the outer annular member.

14. The brush seal according to claim 12, further comprising an annular ramp to which at least a part of the plurality of flexible bristled are tangent.

15. The brush seal according to claim 12, wherein the wind turbine comprises a nacelle and a rotor comprising a hub and at least one rotor blade, wherein the first part is the hub and wherein the second part is selected from a group consisting of the rotor blade and the nacelle.

16. The brush seal according to claim 12, wherein the wind turbine comprises a tower and a nacelle forming the first part and the second part, respectively.

17. A brush seal for a bearing between a first part and a second part of a wind turbine, the bearing comprising a rotational axis, an inner annular member fastened to the first part, an outer annular member fastened to the second part and a circumferential gap between the inner annular member and the outer annular member, the brush seal comprising:
an annular brush body fastened to one of the second part and the outer annular member; and
a plurality of flexible bristles attached to the annular brush body and pre-stressed against a sealing surface of one of the first part and the inner annular member with a tip portion of the plurality of resiliently bendable bristles being bent away from the one of the second part and the outer annular member.

18. The brush seal according to claim 17, wherein the annular brush body is fastened to the outer annular member, and wherein the plurality of flexible bristles is pre-stressed against the sealing surface of the first part.

19. The brush seal according to claim 17, wherein the flexible bristles leave, in a plane comprising the rotational axis, the annular brush body in a direction which deviates from the direction of the rotational axis.

20. A wind turbine comprising a first part and a second part, the second part comprising a sealing surface, the second part being pivot-mounted with respect to the first part using a rolling-element bearing comprising a lubricant and a rotational axis, the wind turbine further comprising a brush seal comprising:
an annular brush body carried by the first part; and
a bundle of resiliently bendable bristles attached to the annular brush body and pre-stressed against the sealing surface with a tip portion of the bundle of resiliently bendable bristles being bent away from the first part.

* * * * *